May 26, 1964  P. FISCH  3,134,600
SEAL CONSTRUCTION FOR ROTARY MECHANISMS
Filed Aug. 30, 1962  3 Sheets-Sheet 1

INVENTOR.
PAUL FISCH
BY
Thomas W. Kennedy
ATTORNEY

May 26, 1964 P. FISCH 3,134,600
SEAL CONSTRUCTION FOR ROTARY MECHANISMS
Filed Aug. 30, 1962 3 Sheets-Sheet 2

INVENTOR.
PAUL FISCH
BY
Thomas W. Kennedy
ATTORNEY

May 26, 1964 P. FISCH 3,134,600
SEAL CONSTRUCTION FOR ROTARY MECHANISMS
Filed Aug. 30, 1962 3 Sheets-Sheet 3

INVENTOR.
PAUL FISCH
BY
Thomas W. Kennedy
ATTORNEY

United States Patent Office 3,134,600
Patented May 26, 1964

3,134,600
SEAL CONSTRUCTION FOR ROTARY MECHANISMS
Paul Fisch, New York, N.Y., assignor to Curtiss-Wright Corporation, a corporation of Delaware
Filed Aug. 30, 1962, Ser. No. 220,512
4 Claims. (Cl. 277—84)

The present invention relates broadly to the art of rotary mechanisms and is particularly directed to oil sealing means for such rotary mechanisms.

The invention is particularly useful in connection with rotary mechanisms similar to that disclosed in United States Patent Number 2,988,065, although as will become apparent, this invention is not limited to this specific type of rotary mechanism. In the following description the invention is described in relation to an internal combustion engine, but the invention is also suitable for fluid pumps and fluid motors.

A rotary engine as disclosed in said patent comprises an outer body or housing having a cavity therein and an inner body or rotor disposed therein rotatable relative to the outer body, about an axis laterally spaced from, but parallel to the axis of said cavity. The inner body is journaled on an eccentric portion of a shaft which is co-axial with the outer body and journaled in bearings carried by the outer body end walls. The outer body has axially-spaced end walls and a peripheral wall interconnecting the end walls to form said cavity; the inner surface of the cavity peripheral wall having a multi-lobed profile which preferably is basically an epitrochoid. The inner body or rotor has end faces disposed adjacent to said outer body end walls for sealing cooperation therewith, and has a peripheral surface with a plurality of circumferentially-spaced apex portions, each carrying a radially-movable seal or seal means for sealing engagement with the multi-lobed inner surface of the outer-body peripheral wall to form a plurality of working chambers between the two bodies which vary in volume upon relative rotation of the two bodies.

A primary object of the invention is to provide improved oil sealing. The bearings between the inner body and the shaft eccentric and the shaft bearings are supplied with lubricating oil under pressure. The inner body or rotor is provided with oil sealing means located on each end face of and co-axial with the inner body and disposed in oil sealing contact with the adjacent end faces of the end walls of the outer body to minimize the passage of oil radially outwardly toward the working chambers between the rotor end face and outer-body end walls. The oil seal is a very important part of the rotary engine since too much oil consumption is costly and produces smoke and deposits while too little oil consumption results in excessive wear and poor seal life.

During operation of the rotary engine the inner body has an eccentric or orbital movement. This movement subjects the oil seal to varying amounts of centrifugal force during the course of a single revolution. The oil seal is also subjected to temperature variations as the working chambers go through their working phases. These varying amounts of centrifugal force taken in conjunction with the varying temperatures to which the oil seal and outer body are subjected tends to cause distortions so that the oil sealing surface of the convention circular seal may no longer be in flat oil-sealing contact with the end walls of the outer-body. If this should happen undesirable leakage of the lubricating oil past the oil seal would result.

In prior combustion engines of this type, the oil seal means comprised an oil seal ring of substantially rectangular cross-section received in an annular groove having axially-parallel groove sidewalls, and with spring means disposed in the bottom of said groove for urging each said oil seal ring axially outward in sealing engagement with the adjacent end walls. The spring acts only in an axial outward direction and assures sealing engagement against its adjacent end wall. However, leakage may occur around the seal on its side within the groove as the spring does not act to seal it against the inner body by urging the seal against the groove sidewall. Also, due to the aforementioned effects of temperatures and centrifugal force the seal may not be in flat oil-sealing contact with the end wall. Thus, the aforementioned prior art form of oil seal may lead to poor sealing.

An object of the present invention comprises the provision of a rotor for a rotary combustion engine in which a novel and simple oil seal means is provided to maintain improved sealing of the fluid or oil used for lubrication and cooling of the rotor, shaft, eccentric, bearings and adjacent parts of the engine.

Specifically, instead of providing an oil seal ring urged only in an axially outward direction by spring means into bearing and sealing engagement against the outer-body end wall, this invention provides an oil seal ring composed of rubber-like elastic material, which is received in a groove with a conical groove sidewall and also is elastically deformed in its circumferential and diametral dimensions so that the oil seal ring bears in sealing engagement radially against said conical groove sidewall and said conical wall being oriented so that radial pressure thereagainst is effective to urge the ring axially outwardly of the groove. The conical side wall of the groove engaged by the oil seal ring may be either the radially inner or the radially outer side wall of the groove but preferably is the radially inner side wall.

Thus, the oil seal of the present invention is in continuous sealing engagement and in forceful bearing against the inner-body groove side wall as well as the end wall of the cavity or outer body thereby effectively preventing leakage around the oil seal without the use of supplementary spring means.

A still further object of the invention comprises the provision of an annular metallic spring means, which is diametrically elastic, in combination with the rubber-like oil seal ring to bear radially against the oil seal ring thereby supplementing the aforementioned sealing action of the oil seal ring.

In accordance with the invention, the oil seal ring preferably has a tapered edge extending around the axially-outer face of said oil seal ring and bearing elastically against the cavity wall in scraping cooperation as well as in sealing cooperation with said cavity wall.

Other objects of the invention will become apparent upon reading the annexed detail description in connection with the drawings in which.

Figure 1:
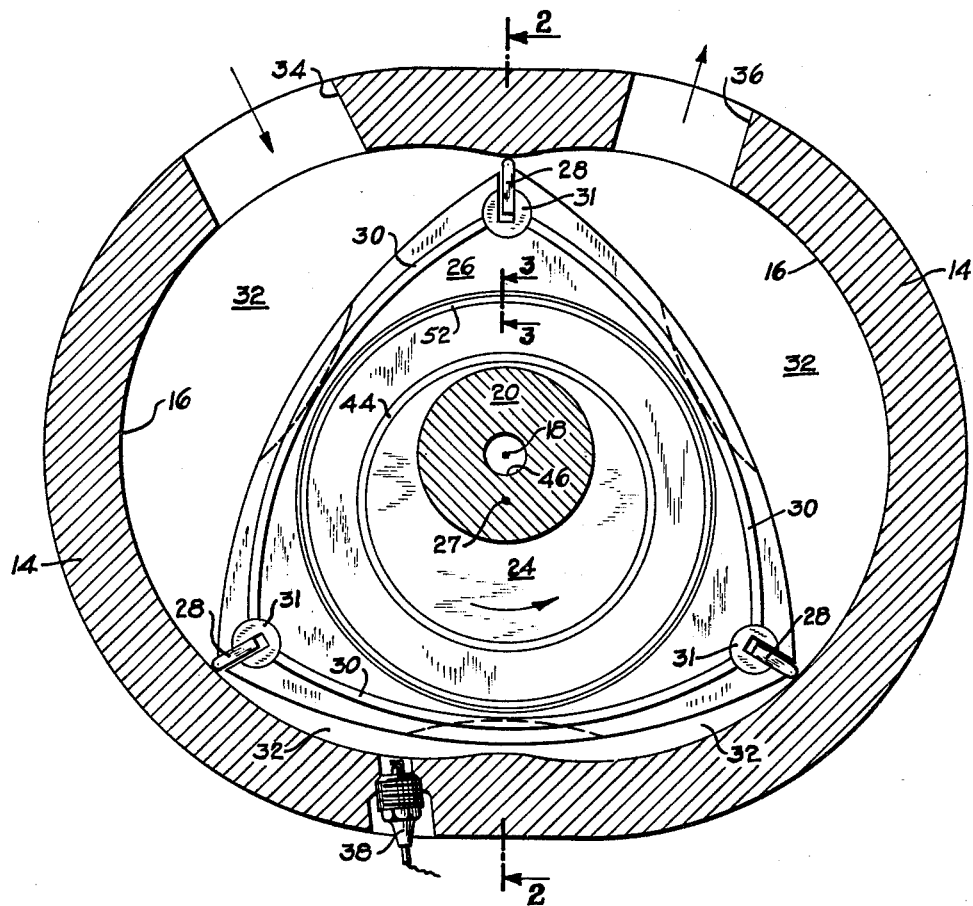
FIGURE 1 is a sectional view of a rotary combustion engine embodying this invention, as taken along line 1—1 of FIGURE 2.
Figure 2:
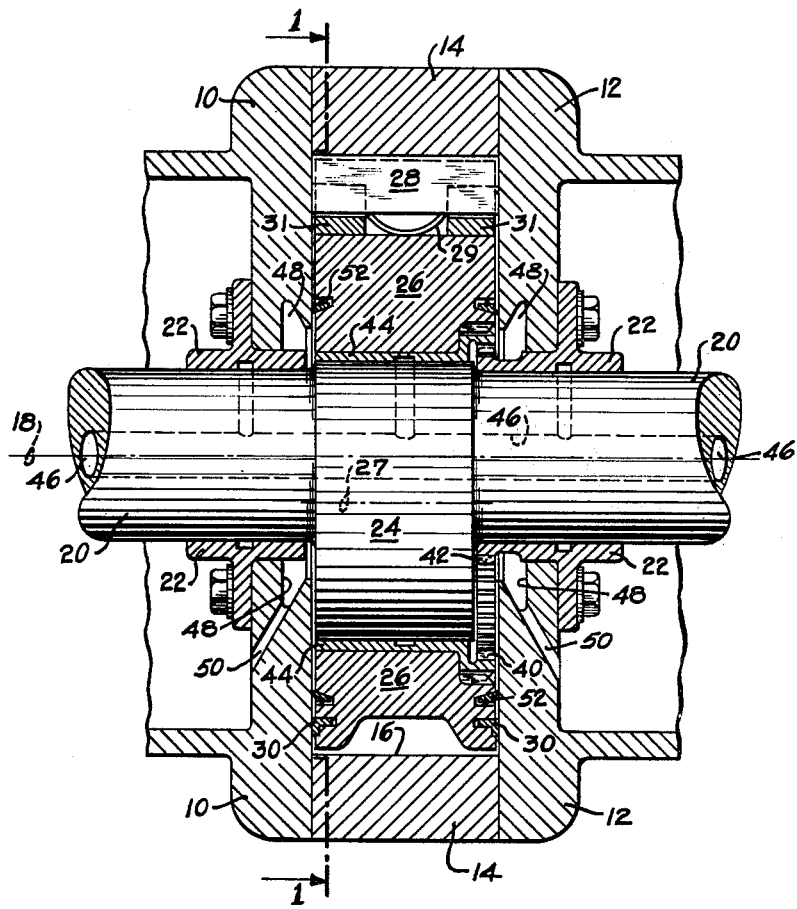
FIGURE 2 is a longitudinal sectional view of a rotary combustion engine in accordance with the invention, as taken along line 2—2 of FIGURE 1.

Referring first to FIGURES 1 and 2 of the drawings, the housing or outer body of a rotary combustion engine comprises spaced end walls 10 and 12, and a peripheral wall 14 disposed between and interconnecting said end walls to form a cavity therebetween. The inner surface 16, of the peripheral wall 14 preferably has a multi-lobed profile in cross section which is basically an epitrochoid.

A shaft 20, having an axis 18, which is co-axial with the axis of the outer body cavity and along which the end walls 10 and 12 are spaced, extends through the outer body and is journaled in bearings 22 carrier by the end walls 10 and 12. The shaft 20 has an eccentric portion 24 on which an inner body or rotor 26 is journaled, the axis of the inner body 26 and the eccentric being indicated at 27.

Inside and eccentric to the housing is disposed an inner body or rotor 26, having a plurality of circumferentially-spaced apex portions about its outer periphery. Each of said apex portions has radially-movable apex seal means 28 received within a single outwardly-facing groove extending in a direction parallel to the rotor axis from one end face to the other of the rotor 26 and urged radially outward by spring means 29 into sealing engagement with the peripheral wall inner surface 16. The inner body 26 also has end faces having end-face seal means 30 and intermediate seal elements 31 disposed in sealing engagement with the end walls 10 and 12 which together with the apex seals 28 forms a plurality of working chambers 32 which vary in volume upon rotation of the inner body 26 relative to the stationary outer body.

The outer body has intake port means 34 for supply of an intake charge to the working chambers 32 and has exhaust port means 36 for discharge of exhaust gases from the engine. If needed, a suitable spark plug 38 may be provided to ignite the intake charge.

In order to maintain the relative motion of the inner body 26 relative to the stationary outer body an internal gear 40, is, as illustrated, secured to the inner body co-axially with the inner body axis 27 and is disposed in mesh with a fixed gear 42 secured to the outer body, as illustrated, said fixed gear 42 being co-axial with the shaft 20.

The bearing surfaces between the rotor journal bearing 44 and shaft eccentric 24 and the shaft bearings 22 are supplied with lubricating oil through the shaft passage 46. During engine operation oil from the bearings 44 and 22 collects in the annular gutter or groove 48 in the end walls from which it drains through openings 50 to a suitable pump (not shown). Some oil will tend to flow along the surfaces of the end walls 10 and 12 facing the rotor 26. The present invention is directed to an oil seal construction which minimizes the oil flow radially outwardly between the rotor 26 and the end walls 10 and 12.

The engine so far described is substantially similar to the engine disclosed in the aforementioned United States Patent Number 2,988,065 and for additional description reference is made to said patent.

According to the invention and as illustrated in FIGURES 1 through 4, the rotor 26 carried an oil seal ring 52 which is composed of rubber-like elastic material and is received in an annular groove 54 having a conical sidewall 56 on its radially inner side with its apex disposed axially outward of the seal ring 52, the groove sidewall 56 being co-axial with the rotor 26. As used herein the term rubber-like is intended to be broad enough to include any elastomeric material.

The oil seal ring 52 is stretched elastically in its circumferential and diametral dimensions so that it bear radially inwardly against said conical wall 56; and because of the described orientation of the conical wall 56 the pressure of said ring 52 thereagainst is effective to urge the ring 52 axially outwardly of the grove 54. The elasticity of the stretched oil seal ring 52, in trying to return to its original shape, exerts radial pressure which has a pressure component urging the oil seal ring 52 outwardly of the groove 54 along the groove conical wall 56 contacted by the oil seal ring 52.

Thus, the oil seal ring 52, acting without the help of supplementary spring means, sealingly bears against the conical wall 56 of the rotor groove 54 and also sealingly bears against the adjacent end wall 10 or 12 of the outer body.

As shown in the embodiment in FIGURES 1 through 4, an annular circumferentially-elastic spring means 58 is preferably disposed co-axially with the oil seal ring 52 in the rotor groove 54. The oil seal ring 52 is disposed between the spring means 58 and the conical wall 56. The spring means 58 is elastically stretched in its circumferential and diametral dimensions similarly to the oil seal ring 52, so that the spring means 58 fits over the oil seal ring 52 and bears radially inwardly against the oil seal ring 52, and thereby increases bearing of the oil seal ring 52 radially against the conical wall 56 and outwardly of the groove 54 against the end wall 10 or 12.

Thus, if the oil seal ring 52 loses some of its elasticity due to high temperatures and centrifugal forces, the spring means 58 will maintain the same sealing actions otherwise carried out by the oil seal ring 52 itself.

The oil seal ring 52 preferably has a tapered edge 68 extending around the axially outer face of the oil seal ring 52 and being in scraping and sealing coperation with the inner surface of the adjacent outer-body end wall 10 or 12. The tapered edge 68 preferably is inclined to the end wall 10 or 12 and points mostly radially inwardly and partly axially outwardly. Hence, the oil seal ring 52 scrapes off excess oil adhereing to the end wall 10 or 12, in addition to providing good sealing. This inclination of the oil seal ring with the adjacent end wall results in the oil seal ring 52 having less bearing surface and greater unit bearing pressure and also with a narrower path of contact against the end-wall inner surface so that leakage caused by unevenness of the end-wall surface is minimized. Said angle of inclination can be between a fraction of a degree to 30°, preferably 6° to 10°.

Friction from the end wall 10 or 12 during the orbital movement of an oil seal ring acts partly transverse to the oil seal cross-section over at least a part of the oil seal circumference; and such transverse force tends to cause local twisting in the prior art form of oil seal ring. The contact pressure between the conical wall 56 and this oil seal ring 52, which is increased by the spring 58 on said oil seal ring 52 when added, minimizes such twisting. Therefore, local twisting of the oil seal ring 52 is avoided so that sealing is improved. In addition, the static friction between the oil seal ring 52 and its conical wall 56 due to the radial pressure of the oil seal ring 52 that prevents circumferential relative movement of the oil seal ring 52 in its groove 54. Such static friction of the conical wall 56 on the oil seal ring 52 opposes any tendency of the ring to move or slide along the groove 54 due to the circumferential friction drag of the end-wall inner surface acting along the axially-outer edge 68 of the oil seal ring 52. Thus, groove friction prevents longitudinal sliding of the seal in its groove.

The oil seal ring 52 has a peripheral face preferably having a co-axial annular recess 76, which also preferably has a matching contour or radius in cross-section, to snugly receive the spring means 58. Hence, the spring means 58 is directly connected to the oil seal ring 52, and exerts a uniform pressure circumferentially thereon to maintain an uninterrupted sealing engagement between the oil seal ring 52 and its adjacent conical wall 56.

The gas radially outward of the oil seal ring 52 is in an enclosure, which is formed between the end face seal means 30 and the oil seal ring 52 and between the rotor end face and the end-wall inner surface, and leakage of gas from the working chambers 32 across the end face seals 30 into said enclosure increases the gas pressure therein. The pressure of the enclosure gas on the radially outward side of the oil seal ring 52 which is assumed to be greater than the pressure of the oil on the radially inward side of the oil seal ring presses the oil seal ring 52 against its conical wall 56 and thereby improves sealing.

In the embodiment as illustrated in FIGURES 1 through 4, centrifugal forces on the oil seal ring 52, due to its rotation and travel in an orbital path, are directed generally in a radially outward direction. The forces from the stretched oil seal ring 52 itself, the stretched spring means 58, and the excess of gas pressure over oil pressure on the oil seal ring 52 act radially inwardly. The sum of such radially inward forces is made large enough to provide always a net radially inward force to cause the oil seal ring 52 to bear against its conical wall 56. The seal ring 52 bears against its conical wall 56 with sufficient pressure to sealingly engage said conical wall, to sealingly bear against the end wall 10 or 12 and to develop enough static friction along said conical wall 56 in order to prevent circumferential sliding of the oil seal ring 52 along its groove 54 and to provide sufficient contact pressure to minimize twisting of the seal as previously described.

Figure 3:
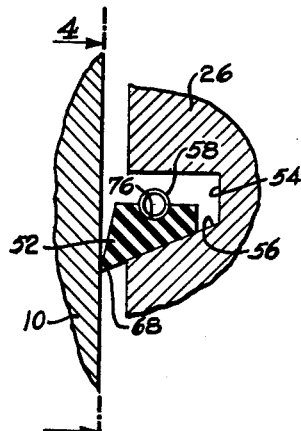
FIGURE 3 is an enlarged partial sectional view, as taken along line 3—3 of FIGURE 1 of an oil seal embodying the invention.
Figure 4:
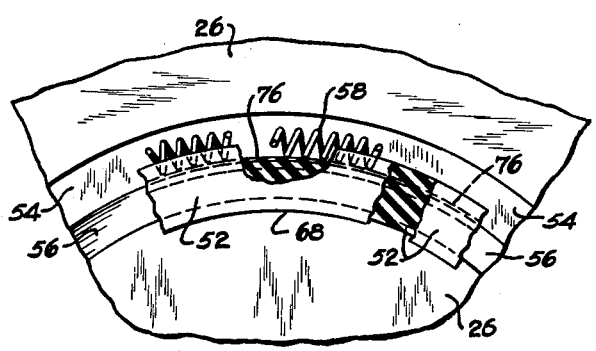
FIGURE 4 is an enlarged, sectional view, as taken along line 4—4 of FIGURE 3.
Figure 7:
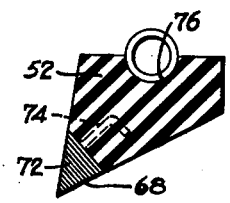
FIGURE 7 is an enlarged detail of the seal shown in cross-section in FIGURE 3 with an additional feature embodying the invention.

The tip 72 of the tapered edge 68 as shown in FIGURE 7 of the oil seal ring 52 as shown in FIGURES 3 and 4 preferably is made of material of greater hardness and longer wearing life such as steel, than the rubber-like material of the oil seal 52 itself. The ring-shaped tip 72 also has at least one leak-proof expansion joint (not shown) to allow its expanding circumferentially and diametrically, substantially simultaneously with the oil seal ring 52. As illustrated in FIGURE 7 the tip 72 not only is bonded by adhesive to the oil seal ring 52 but also has anchors 74 to strengthen the bond. In this way, the tip 72 improves the scraping and sealing actions of the tapered edge 68 of the oil seal ring 52.

The use of a hardened or metal tip 72 on the seal edge 68 also helps to reduce edge friction drag of the end-wall inner surface on the seal edge 68. Hence, the chance of longitudinal sliding of the oil seal ring 52 in its groove 54 is further minimized.

Figure 5:
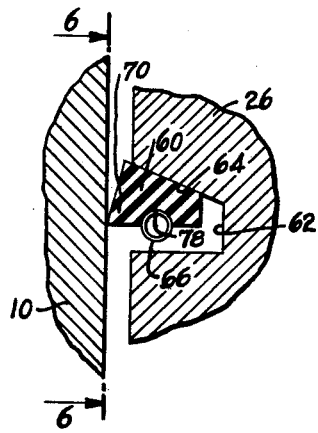
FIGURE 5 is an enlarged sectional view, as taken similarly to FIGURE 3 showing an alternate oil seal embodying the invention.
Figure 6:
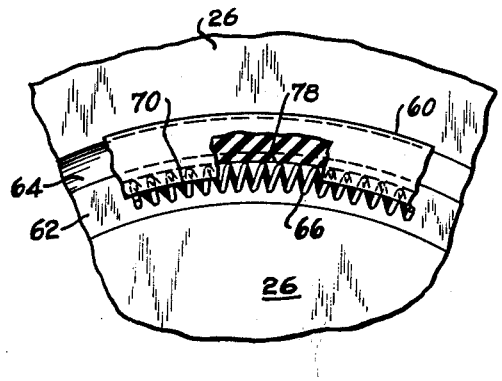
FIGURE 6 is a sectional view, as taken along line 6—6 of FIGURE 5.

FIGURES 5 and 6 show another embodiment in which the conical wall 64 engaged by the rubber-like seal ring 60 is disposed on the radially outer side of the groove 62 with the apex of the conical wall 64 disposed axially inward of the seal ring 60. The oil seal ring 60 is compressed elastically in its circumferential and diametral dimensions inside the conical wall 64 and it bears radially outwardly against the conical wall 64, and with the orientation of the conical wall described the pressure of the seal ring 60 thereagainst is effective to urge the ring 60 axially outwardly of the groove 62 against the adjacent end wall, so that it also provides good sealing.

In this second embodiment of FIGURES 5 and 6, centrifugal forces on the oil seal ring 60 are directed generally in a radially outward direction, in the same direction as the forces from the compressed oil ring 60, from the compressed spring means 66, and from the oil pressure in the groove 62; and all these major forces act together and press the oil seal ring 60 against its conical wall 64, thereby improving the sealing.

The oil seal ring 52 or 60 is preferably composed of a rubber-like elastic material which remains elastic under high operating temperatures and centrifugal loading. In addition, the material is sufficiently elastic to rapidly conform to minute changes in circumferential and diametral dimensions. For example, the oil seal ring 52 or 60 may be made of a material defined by Aerospace Material Specification of the Society of Automotive Engineers AMS 7279, which is a fluorocarbon type of rubber, of 85 to 95 durometer hardness, but an 80 to 100 durometer is also suitable. This material has in practice been found to be suitable for use in contact with fuels, lubricants and hydraulic fluids at temperatures up to 500° F.

As an example of a typical oil seal ring in accordance with the invention as illustrated in FIGURES 1 through 4, the engine rotor 26 carries about a 6 inch diameter rubber seal 52 of roughtly a ¼ inch by ¼ inch cross-section with a garter spring 58 of ⅛ inch coil diameter. The conical wall 56 is at an angle of 20° to the rotor axis, that is having a 40° apex angle with the apex point axially outward of the seal ring. The spring 58 is such so that upon assembly it exerts a radially inward force of between two pounds to six pounds per linear inch of circumference. The axially outer face of the oil ring 52 has an angle inclined about 6° to the end-wall inner surface.

In both forms of the invention the conical walls 56 and 64 constitute annular conical shoulders against which the rubber seal rings bear.

While I have described my invention in detail in its present preferred embodiment it will be obvious to those skilled in the art after understanding my invention that various changes and modifications may be made therein without departing from the spirit and scope of the invention. It is intended by the appended claims to cover all such modifications.

What is claimed is:

1. A rotor and shaft structure for use in a rotary mechanism having a cavity with spaced end walls and within which said rotor is received; said shaft being supported by said end walls and having an eccentric portion on which said rotor is journaled; said rotor having a pair of end faces in sealing cooperation with said end walls; said rotor having an annular groove disposed on one of said end faces with said groove having a conical sidewall on its radially inner side which is co-axial with the rotor; and an oil seal ring received in said groove, composed of rubber-like elastic material and being elastically stretched to fit over said conical wall so that said oil seal ring sealingly bears radially inwardly against said conical groove sidewall and said conical wall being oriented so that radial pressure of said ring thereagainst is effective to urge the ring axially outwardly of the groove; said oil seal ring having a conical face on its axially outer side with a tapered seal edge directed radially inwardly and axially outwardly.

2. A rotor for use in a rotary mechanism as claimed in claim 1 and including an annular elastic spring means disposed co-axially in said groove; said oil seal ring being disposed radially between said spring means and said conical wall; said spring means being elastically deformed to fit over said oil seal ring so that said spring means bears radially inwardly against said oil seal ring to increase the bearing of said oil seal ring against said conical wall and to increase the urging of said oil seal ring axially outwardly of said groove.

3. A rotor for use in a rotary mechanism as claimed in claim 2 and in which said oil seal ring has a peripheral face with a co-axial annular recess and said spring means is a metallic garter-type spring disposed in said seal ring recess.

4. A rotor for use in a rotary mechanism as claimed in claim 1 and in which said tapered edge portion is made of a harder material than the remainder of said ring seal.

References Cited in the file of this patent

UNITED STATES PATENTS

| | | |
|---|---|---|
| 723,656 | Dunn | Mar. 24, 1903 |
| 1,698,876 | Clanin | Jan. 15, 1929 |
| 1,899,630 | Nelson | Feb. 28, 1933 |
| 1,967,703 | Bullington | July 24, 1934 |
| 2,051,346 | Rugland | Aug. 18, 1936 |

FOREIGN PATENTS

| | | |
|---|---|---|
| 138,062 | Great Britain | Feb. 17, 1921 |
| 204,789 | Great Britain | Oct. 8, 1923 |